(12) United States Patent
Banerjea et al.

(10) Patent No.: US 8,762,754 B2
(45) Date of Patent: *Jun. 24, 2014

(54) ACCESS POINT ROTATION FOR SHARING POWER LOAD

(71) Applicant: Marvell World Trade Ltd., St. Michael (BB)

(72) Inventors: Raja Banerjea, Sunnyvale, CA (US); Milind Kopikare, Mumbai (IN); Paul A. Lambert, Mountain View, CA (US); Robert Fanfelle, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,546

(22) Filed: Jun. 17, 2013

(65) Prior Publication Data

US 2013/0279388 A1    Oct. 24, 2013

Related U.S. Application Data

(63) Continuation of application No. 12/499,937, filed on Jul. 9, 2009, now Pat. No. 8,468,374.

(60) Provisional application No. 61/080,143, filed on Jul. 11, 2008.

(51) Int. Cl.
*G06F 1/32* (2006.01)

(52) U.S. Cl.
USPC ............ 713/320; 713/300; 713/323; 713/324

(58) Field of Classification Search
USPC .................. 713/300, 310, 320, 323, 324, 340
See application file for complete search history.

(56) References Cited

U.S. PATENT DOCUMENTS

| | | | |
|---|---|---|---|
| 6,901,275 B1 | 5/2005 | Aoyagi | |
| 7,035,240 B1 | 4/2006 | Balakrishnan et al. | |
| 8,468,374 B2 * | 6/2013 | Banerjea et al. | ............... 713/320 |
| 2003/0195019 A1 | 10/2003 | Litwin | |
| 2005/0018643 A1 | 1/2005 | Neilson et al. | |
| 2005/0262216 A1 | 11/2005 | Kashiwabara et al. | |
| 2006/0218419 A1 | 9/2006 | Iwamura et al. | |
| 2007/0293223 A1 | 12/2007 | Kuwana | |
| 2009/0316585 A1 | 12/2009 | Srinivasan et al. | |
| 2010/0002610 A1 | 1/2010 | Bowser et al. | |

FOREIGN PATENT DOCUMENTS

| | | |
|---|---|---|
| EP | 1 324 540 A2 | 7/2003 |
| WO | WO 01/06824 | 2/2001 |

OTHER PUBLICATIONS

Nov. 12, 2009 International Search Report issued in International Application No. PCT/US2009/050006.
Nov. 12, 2009 Written Opinion issued in International Application No. PCT/US2009/050006.

(Continued)

*Primary Examiner* — Paul Yanchus, III

(57) ABSTRACT

Aspects of the disclosure provide a method for sharing power load in a network. The method includes identifying a first device to serve as an AP of the network in a next time interval, providing network information from a second device that presently serves as the AP to the first device. When the first device starts to serve as the AP of the network, the second device can be configured to enter into a power save state in order to reduce power consumption by the second device in the next time interval.

20 Claims, 8 Drawing Sheets

(56) References Cited

OTHER PUBLICATIONS

IEEE Standards, IEEE Standard for Information Technology, IEEE Std 802.11b-1999/Cor 1-2001, IEEE Computer Society, The Institute of Electrical and Electronics Engineers, Inc., New York, NY, Nov. 7, 2001, 23 pages.

Draft Supplement to Standard [for] Information Technology, IEEE P802.11g/D8.2, Apr. 2003 (Supplement to ANSI/IEEE Std 802.11 1999 (Reaff 2003)), The Institute of Electrical and Electronics Engineers, Inc., New York, NY, pp. 1-69.

Part 11: Wireless LAN Medium Access Control (MAC) and Physical Layer (PHY) Specifications, High-speed Physical Layer in the 5 GHz Band, Supplement to IEEE Standard for Information Technology, IEEE Std 802.11a-1999, 91 pages.

IEEE Standard for Local and Metropolitan Area Networks, Part 16: Air Interface for Fixed Broadband Wireless Access Systems, IEEE Computer Society and the IEEE Microwave Theory and Techniques Society, IEEE Std 802.16—2004, New York, NY, Oct. 1, 2004, pp. 1-857.

\* cited by examiner

ACCESS POINT ROTATION FOR SHARING POWER LOAD

INCORPORATION BY REFERENCE

This application is a continuation of U.S. application Ser. No. 12/499,937, filed on Jul. 9, 2009, now issued as U.S. Pat. No. 8,468,374, which claims the benefit of U.S. Provisional Application No. 61/080,143, filed on Jul. 11, 2008. The disclosures of the applications referenced above are incorporated herein by reference.

BACKGROUND

In a wireless network, access points (APs) may be used to support communications among mobile devices. In certain applications, the APs may have limited power supply, such as battery-powered APs, solar powered APs, and the like. For these APs, power consumption can become an issue.

SUMMARY

Aspects of the disclosure can provide a method, a network, and a wireless device that can use access point (AP) rotation scheme to share power load. The AP rotation scheme can rotate nodes of a network to serve as an AP of the network, and thus can share power load of the AP among the nodes.

The method for sharing power load of an AP in a network can include identifying a first device to serve as an AP of the network in a next time interval, providing network information from a second device that presently serves as the AP to the first device. When the first device starts to serve as the AP of the network, the second device can be configured to enter into a power save state in order to reduce power consumption by the second device in the next time interval.

According to the disclosure, the network information can include at least membership information, service information, and power level information.

According to an aspect of the disclosure, the first device can change an associated Media Access Control (MAC) address with a MAC address of a master-AP, and start to send messages that include the MAC address of the master-AP. In addition, the first device can receive and process messages that are directed to the AP of the network in a next time interval.

According to an aspect of the disclosure, to identify the first device to serve as the AP of the network, the method can include determining the first device to serve as the AP of the network based on one or more conditions.

According to an aspect of the disclosure, the one or more conditions can include at least one of a MAC address of the first device and a power level of the first device.

In addition, the first device can be determined to serve as the AP of the network if the first device has the highest power level.

According to an aspect of the disclosure, the one or more conditions can include a pre-determined sequence.

In addition, the method can include configuring the second device to a normal operation state at the end of the next time interval.

In an embodiment, the next time interval is a pre-negotiated beacon interval.

According to the disclosure, a wireless device in a network can include a wireless interface configured to transmit and receive wireless signals, and a controller configured to identify a next device to serve as an AP of the network in a next time interval. Further, the controller can be configured to inform the wireless interface to transmit network information to the next device when the wireless device presently serves as the AP of the network, and switch the wireless device into a power save state after the next device starts to serve as the AP of the network in the next time interval.

According to the disclosure, the wireless device can be used as a node in a network. The network can include a first node configured to serve as an AP of the network in a first time interval by using a MAC address of a master-AP in association of the network, and at least a second node configured to serve as the AP of the network in a second time interval by using the MAC address of the master-AP, wherein the first node updates the second node with network information when the second node starts to serve as the AP of the network, and the first node is further configured to enter a power save state in the second time interval.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
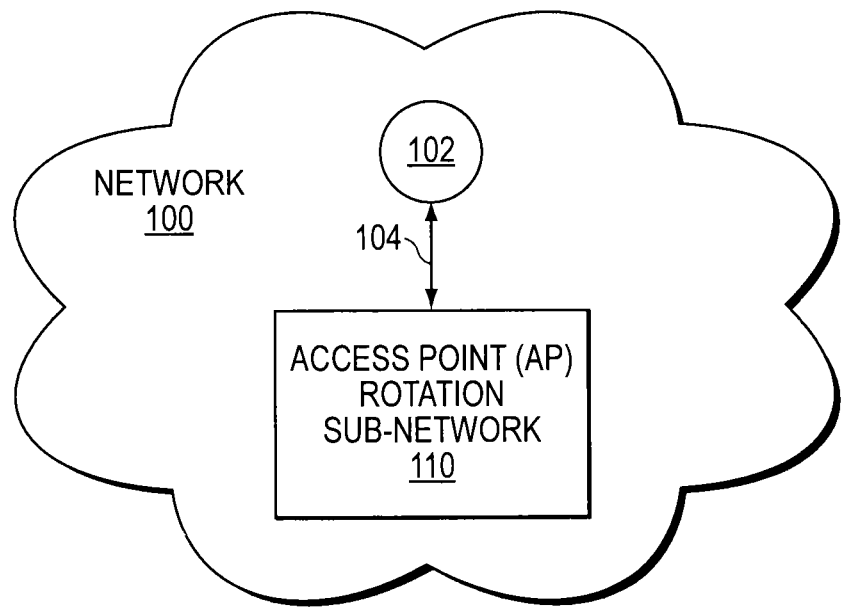
FIG. 1 shows a block diagram of an exemplary network.

FIG. 1 shows a block diagram of an exemplary network 100. The network 100 can include a sub-network 110, such as a wireless local area network (WLAN), and the like. The sub-network 110 may include a plurality of nodes. Further, at least one of the plurality of nodes can be configured to serve as an access point (AP). The AP can enable the sub-network 110 to communicate to nodes outside of the sub-network 110. For example, the AP can enable communication to another sub-network 102 via communication channel 104. According to the disclosure, the sub-network 110 may apply an AP rotation scheme that configures different set of nodes to serve as APs at different time intervals.

The nodes of the sub-networks 110 and 102 can include various wireless devices. For example, the nodes can include mobile devices, such as laptops, mobile phones, personal digital assistants, and the like. In another example, the nodes can include stationary devices, such as desktops, printers, workstations, and the like, that are equipped with a wireless network interface card that can enable wireless communications.

The communication channel 104 can be a wired communication channel, such as a cable line or digital subscriber line (DSL), and the like. The communication channel 104 also can be a wireless communication channel that can be implemented according to various standards and protocols, such as Wi-Fi (IEEE 802.11 a/b/g), WiMax (IEEE 802.16), Bluetooth, GSM, GPRS, UMTS, and the like.

The sub-network 110 can include an AP. The AP can enable communication to nodes outside of the sub-network 110. According to the disclosure, the sub-network 110 may apply an AP rotation scheme, thus at different times, different nodes may serve as the AP. For example, in a first time interval, a first node in the sub-network 110 may serve as the AP and in a second time interval, a second node in the sub-network 110 may serve as the AP. The AP rotation scheme may determine which nodes of the sub-network 110 to serve as the AP. The determination can be based on various conditions, e.g., power level, MAC address of a node, a pre-determined sequence, and the like. In this manner, the nodes of the sub-network 110 can rotate to function as the AP. In addition, when nodes are not configured to serve as the AP, they may be configured to engage in power save modes. Thus, the nodes of the sub-network 110 may be alternatively configured to serve as the AP and alternatively configured to engage in power save modes.

During operation, for a time period, a first node of the sub-network 110 can be configured to serve as the AP of the sub-network 110. The first node can enable communication with nodes out of the sub-network 110, for example, via the communications channel 104. In addition, the first node may manage, for example, membership update of the sub-network 110. For example, a node may join the sub-network 110 by registering with the AP vis-à-vis the first node. After the time period, a second node of the sub-network 110 can be determined to serve as the AP, based on, for example, power level of the second node. The first node can notify or acknowledge the second node, and update the second node with the sub-network information (e.g., a node joined the sub-network 110). Subsequently, the second node of the sub-network 110 can serve as the AP. Similarly, after another time period, another node can be determined to serve as the AP. In addition, while the second node serves as the AP, the first node may be configured to go into a power save mode. In the power save mode, the first node may operate at a power level that is less than the power level necessary to operate as the AP.

Figure 2:
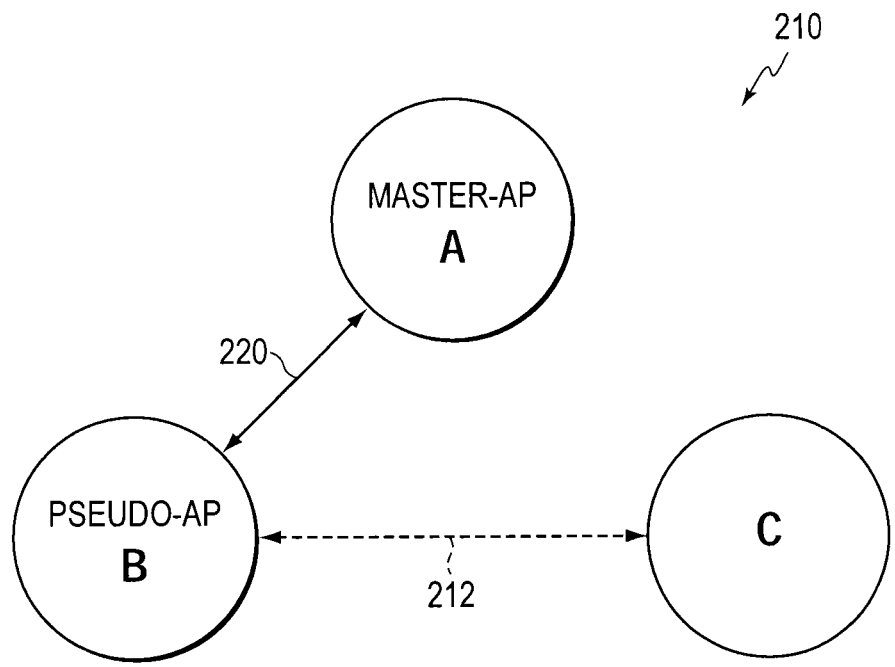
FIG. 2 shows a block diagram of an access point (AP) rotation sub-network example.

FIG. 2 shows a plot illustrating an exemplary scenario of a sub-network 210 utilizing an AP rotation scheme. The sub-network 210 can include a plurality of nodes, such as nodes A and B that are coupled by a communication channel 220. Further, another node C may want to join the sub-network 210. Nodes A, B, and C can be any of the devices aforementioned.

The plurality of nodes may communicate via communication channels. For example, nodes A and B may communicate via channel 220. The nodes may communicate user data, control data, and the like. In an example, the nodes may communicate power levels of nodes, MAC addresses of nodes, sub-network membership of nodes and the like.

In an embodiment, among the plurality of nodes, one or more nodes may have the capability to serve as the AP of the sub-network 210, and at least one of the nodes may be configured to serve as a master-AP of the sub-network 210. Further, the MAC address of the master-AP may be associated with the sub-network 210. For example, nodes A and B can be configured to serve as the AP during different times. Node A can be configured as the master-AP of the sub-network 210, and node B can be configured as a pseudo-AP; and the pseudo-AP can emulate the master-AP to serve as the AP of the sub-network 210 when node A is in a power save state.

Node A can send out messages such as a beacon that can include, for example, the MAC address of node A at a specific field to identify node A as the master-AP of the sub-network 210. On the other hand, other nodes can send messages that can include node As MAC address at a specific field to identify the messages as being directed to the AP of the sub-network 210. For example, in a time period, such as a negotiated beacon interval, the master-AP, which is node A in FIG. 2, can provide access point service for nodes in the sub-network 210. Node A can handle incoming messages, e.g., unitest probe request frame, IEEE action management frame, and the like. In addition, node A can enable communication between the sub-network 210 and, for example, another sub-network.

In an embodiment, node A can determine a next node, such as node B, to serve as the AP. In another embodiment, node A can retrieve from a memory a sequence of nodes for serving as the AP of the sub-network 210. The sequence of nodes may indicate the next node to serve as the AP of the sub-network 210. Further, node A can update node B with the sub-network information collected while node A was serving as the AP. Then, node B may start to serve as the AP. Subsequently, for example, if node A does not have other activities, node A can be configured to go into a power save state. For example, at least a portion of node A can be powered off.

In an embodiment, node B may be configured as a pseudo-AP by changing the MAC address of node B with the master-AP MAC address. Further, node B can send out a beacon including the master-AP MAC address (e.g., MAC address of node A) in a specific field to represent itself as the AP of the sub-network 210. In addition, node B may process messages directed to the AP of the sub-network 210. Thus, other nodes can communicate to the AP of the sub-network 210 in the same way, regardless of which node is serving as the AP. For example, node C, which is interested in joining the sub-network 210, may need to receive information, such as frequency bandwidth supported, unit of times used by the sub-network 210, and the like. Node C can send a request message (e.g., service registration request) to the AP for joining the sub-network 210. The AP, which can be served by node A or B, may send a response message (e.g., service registration response) to node C to allow the request, and store the information regarding node C (e.g., registered service of node C). Further, node B presently serving as the AP can update a next node with the information when the next node is rotated to serve as the AP of the sub-network 210. In addition, node B may send out messages to announce the power level of node B.

More specifically, node A can serve as the AP of the sub-network 210 for a first time interval, such as a negotiated first beacon interval of, for example, 10 ms. Node A can operate at a high power consumption mode. For example, node A can send a beacon including the MAC address of node A designated as the master-AP address. In addition, node A can actively listen to messages directed to the AP of the sub-network 210. When the first beacon interval expires, node A may acknowledge node B to be a next node to serve as the AP. In an example, node A may determine that node B has a sufficient power level and can become the next AP. Then, node A can update node B with the sub-network 210 information. Node B can start to serve as the AP in a second beacon interval, and node A can be configured to go into a power save state, for example, if node A does not have other activities. When node B serves as the AP, node B may emulate itself as the AP of the sub-network 210 by changing the MAC address of node B with the MAC address of the master AP. Further, node B can send out a beacon including the MAC address of node A (master-AP MAC address in a specific field) to identify itself as the AP of the sub-network 210.

Node C, for example, may detect the beacon, and send a service registration request message to the AP of the sub-network 210, which is served by node B in the second beacon interval, to join the sub-network 210. Node B may send a service registration response message to node C to allow the request. The service registration response message can be sent as coming from the AP of the sub-network 210. In addition, node B can store the information regarding node C, such as registered service of node C. When the second beacon interval expires, node B may acknowledge a next node, for example, node A to serve as the AP. Node B can update node A regarding node Cs registration. Then, node A may start to serve as the AP of the sub-network 210 with updated sub-network information.

In this manner, node A and node B may alternatively serve as the AP for a time interval. It is noted that while the above example uses two nodes to serve as the AP of the sub-network 210, more than two nodes can be used. For example, the newly joined node C could serve as the AP by rotating the AP role among the three nodes A, B, and C in a certain order, e.g., in order of their MAC addresses. An AP rotation scheme for a time duration, e.g., beacon interval, can distribute the power load of the nodes in a desired manner, such as substantially symmetrical.

Figure 3:
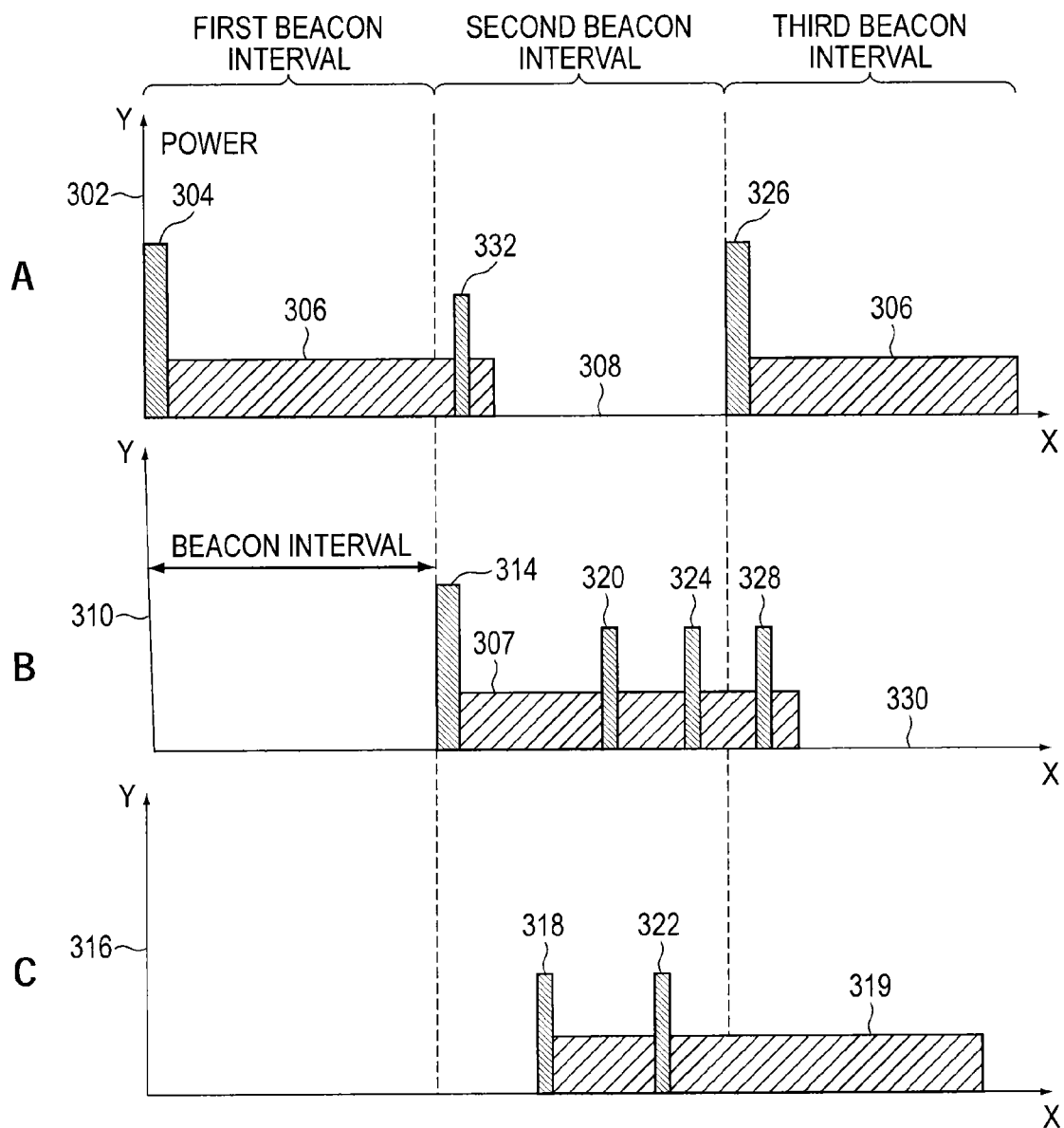
FIG. 3 shows a set of diagrams illustrating power consumption in an AP rotation network example.

FIG. 3 shows a set of exemplary diagrams illustrating power consumption in the sub-network 210 with an AP rotation scheme. The set of diagrams 302, 310 and 316 show power consumptions (Y-axis) versus time (X-axis) for nodes A, B, and C, respectively. The sub-network 210 may be configured to rotate AP according to beacon intervals. Nodes A, B, and C may have different power consumption in different beacon intervals, such as a first beacon interval, a second beacon interval, and a third beacon interval as shown in FIG. 3.

During the first beacon interval, node A can be configured as the AP of the sub-network 210, and thus may have a high power consumption. For example, node A can send out a beacon indicated by a high power consumption level 304. In general, node A may operate at a power consumption level 306, for example, actively listening to incoming traffic. The beacon can include the MAC address of node A, which is configured as the master-AP. In addition, the beacon may include the power level of node A. Nodes B and C can operate as non-APs. For example, if nodes B and C have no activities, and they can be configured to engage in a power save state, as shown in FIG. 3, thereby reducing power consumption.

When the first beacon interval expires, node A may acknowledge that node B can become a next node to serve as the AP. In an embodiment, the node presently serving as the AP may determine which node is the next node to serve as the AP. In another embodiment, a AP rotation sequence can be pre-determined and stored. Then, node B can wake up from the power save state and send out a beacon, which can be indicated by a power consumption level 314, and operate at a power consumption level 307 while serving as the AP. Node B may change its MAC address with the master-AP MAC address. Further, the beacon can include the MAC address of node A, (which is the master-AP) that can be used to identify the beacon as coming from the AP of the sub-network 210. Node A may send out an update message, which can be indicated by a power consumption level 332 for updating node B with network information. Then, node A can operate in a non-AP mode. For example, node A can be configured to go into a power save mode, as indicated by power consumption level 308 for the second beacon interval.

During the second beacon interval, node B can serve as the AP of the sub-network 210. Node B may receive incoming messages that are directed to the AP of the sub-network 210 from other nodes, for example, nodes A and C. In an example, node C may wake up and want to join the sub-network 210. Node C can send, for example, a service registration request message indicated by a power consumption level 318 to the AP of the sub-network 210, which is served by node B. Node B may respond to the service registration request, for example, by sending out a service registration response message indicated by a high power consumption level 320. The service registration response message can include the master-AP MAC address to indicate that the message is coming from the AP of the sub-network 210. Further, node C can send out, for example, an authorization request message as indicated by a power consumption level 322, to the AP of the sub-network 210. In response, node B may send out an authorization response message, as indicated by a power consumption level 324, including the master-AP MAC address to node C.

When the second beacon interval expires, node B may acknowledge that node A is the next node to serve the AP. As shown in FIG. 3, for example, node A can wake up from a power save mode, send out a beacon indicated by a high power consumption level 326, and operate at a power consumption level 306 to serve as the AP. Node A may change its MAC address with the master-AP MAC address if they are different (e.g., a master-AP MAC address provided by a sub-network different from any MAC address of the sub-network nodes). The beacon can include the master-AP MAC address to indicate that the beacon is coming from the AP of the sub-network 210. In an embodiment, the beacon may include the power level of node A. Node B may send out an update message indicated by the power consumption level 328 for updating node A with the sub-network information, such as, node C joining the sub-network 210. Then, node B can operate as a non-AP node. For example, node B can be configured to go into a power save mode, as indicated by power consumption level 330.

During the third beacon interval, node A can be configured as the AP of the sub-network 210 again. Node A may listen and process incoming messages from other nodes, for example, nodes B and C (not shown). Node B and node C may operate in non-AP modes. For example, node B may be configured to engage in a power saving mode when node B does not have other activities, and node C may have other activities and may operate at a normal power level.

As illustrated above, the power consumption levels 304, 306, 332, 308, 326, 314, 307, 320, 324, 328, 330, 318, 319, and 322 could vary depending on type, activity, mode of operation of nodes, and the like; each node may consume different amounts of power while operating as the AP as well as a non-AP node. Therefore, the AP rotation scheme can be further modified by taking different conditions into consideration for distribution of the power load in desired manners. The different conditions may include, but not limited by, a node with the highest power level, a duration of time serving as the AP, an order of MAC address of a node, combination of two or more of these conditions, and the like.

Figure 4:
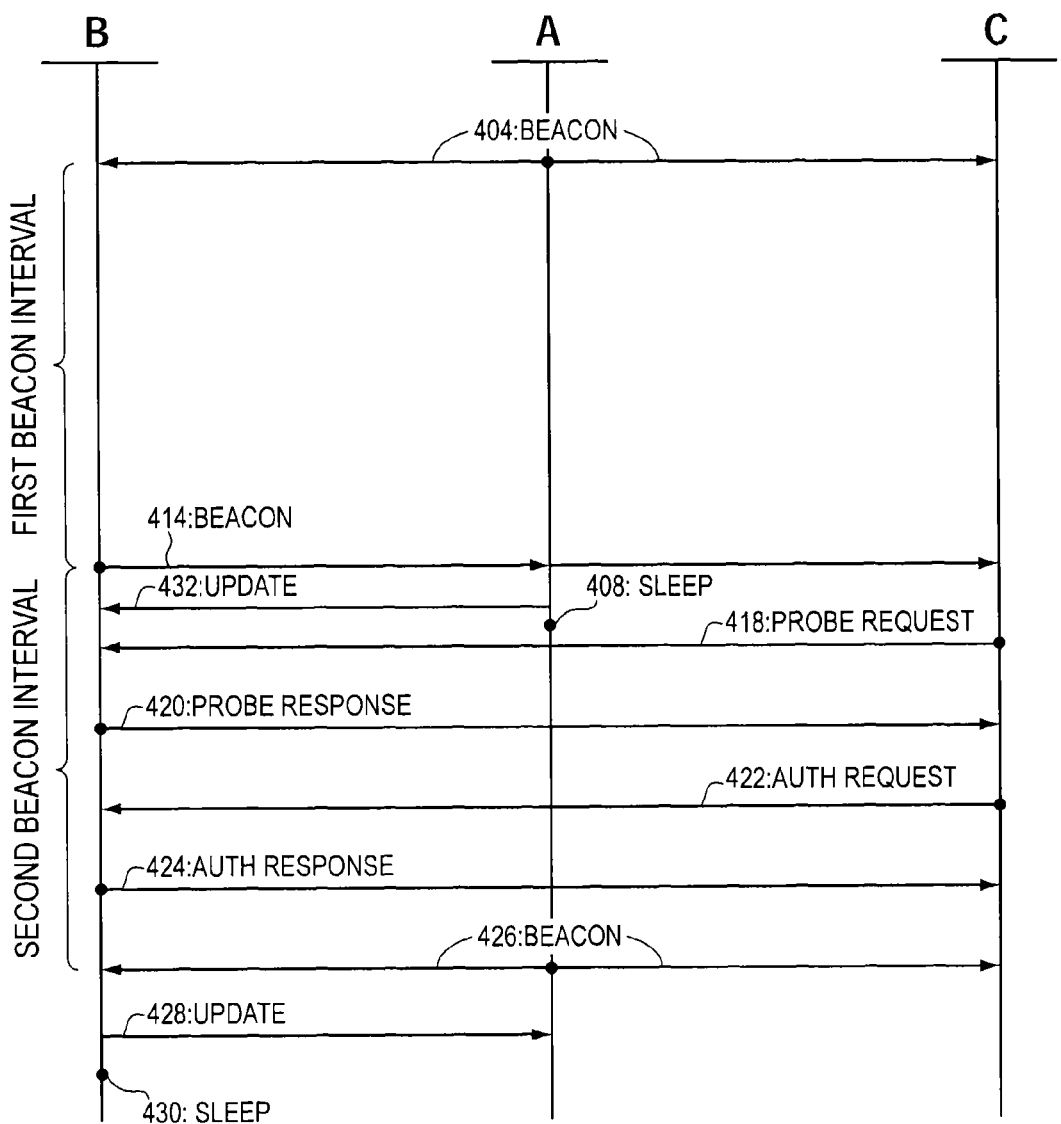
FIG. 4 is a message sequence chart illustrating an exemplary sequence of messages being exchanged between network nodes.

FIG. 4 is a message sequence chart illustrating an exemplary sequence of messages being exchanged between nodes A, B of the sub-network 210, and node C. At the beginning of the first beacon interval, node A can be configured to operate as the AP and send out a beacon 404, which can include the master-AP MAC address. The master-AP MAC address can be a MAC address of node A since node A is the master-AP in the example. In another embodiment, the master-AP MAC address can be a MAC address that is unique from any MAC address of the sub-network nodes to prevent from having more than one active nodes with the same MAC address at a time. The beacon 404 can also include the present power level of node A. Node A can serve as the AP for the first beacon interval. At the end of the first beacon interval, node B can be configured to operate as the AP and send out the beacon 414, which can include the master-AP MAC address, and identify that the beacon comes from the AP of the sub-network 210. The beacon 414 can also include the present power level of node B.

In addition, node A can send the update message 432 to the AP, which is served by node B. Then, node A can be configured to go into a power saving state, such as a sleep mode 408 in FIG. 4, operating at a reduced power consumption level. During the second beacon interval, when node B serves as the AP, node C may send out a probe request 418 to the AP. Node B can return a probe response 420, which can include the master-AP MAC address to indicate that the probe response is from the AP of the sub-network 210, to node C. Further, node C may send out an authorization request 422 to the AP. Node B then can return an authorization response 424, which can include the master-AP MAC address to indicate the authorization response as coming from the AP of the sub-network 210, to node C. At the end of the second beacon interval, node A can wake up, and send out the beacon 426, which can include the master-AP MAC address and the current power level of node A. Node B can send out the update message 428, which can include the information gathered by node B while serving as the AP, to node A. Then, node B can be configured to go into a power save state operating at a reduced power consumption level, such as a sleep mode 430 in FIG. 4.

Figure 5:
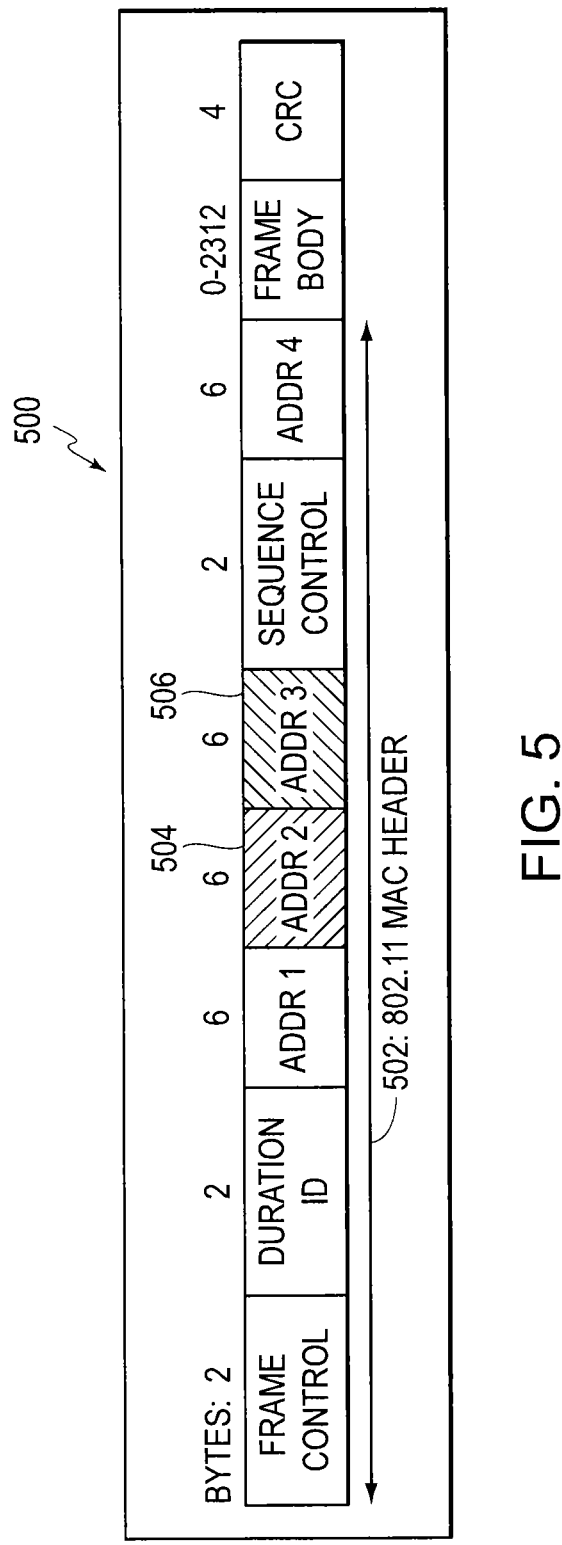
FIG. 5 shows a block diagram of an exemplary format of a message structure.

FIG. 5 shows an exemplary message format 500 that can be used, for example, by the sub-network 210 to implement an AP rotation scheme. The message format 500 can include a MAC header 502. The MAC header 502 can include an Address-2 field 504 and an Address-3 field 506. The Address-2 field 504 and the Address-3 field 506 may include the master-AP MAC address to indicate that the message is from the AP of the sub-network 210. Thus, a pseudo-AP may send beacons and responses using the master-AP MAC address as the Address-2 and Address-3.

Figure 6:
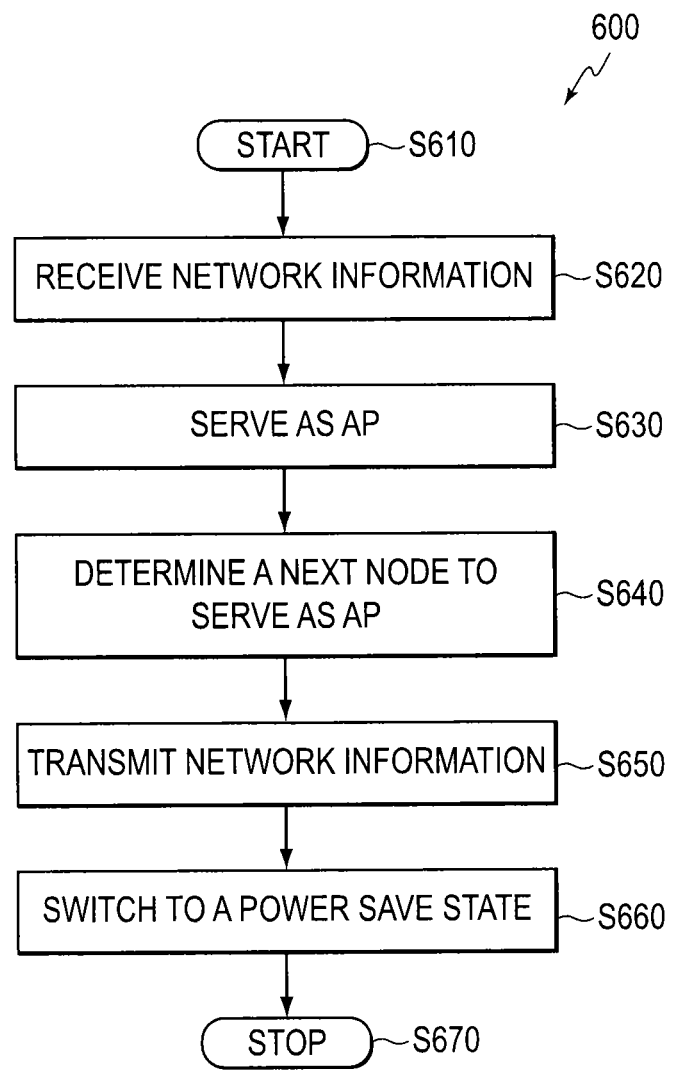
FIG. 6 shows a flow chart outlining an exemplary process for an AP rotation scheme.

FIG. 6 shows a flow chart outlining an exemplary process 600 for a network node in a network to operate according to an AP rotation scheme. The network can include a master AP, and a MAC address of the master-AP can be associated with the network. The network may be identified by the master-AP MAC address. The process starts at step S610, and proceeds to step S620.

In step S620, the node can be designated as the AP of the network for a time interval. The node can receive network information (e.g., notification and/or information necessary to serve as the AP) from, for example, a node presently serving as the AP. In an embodiment, the node may power up from a power save mode and receive the network information. Then, the process proceeds to step S630.

In step S630, the node can start to serve as the AP. More specifically, the node may start sending out beacons. The beacons may include the master-AP MAC address. In addition, the node can receive messages directed to the AP of the network, and process the messages. For example, the node may change its MAC address to the MAC address of the master-AP, and thus can respond to messages directed to the AP of the network. Then, the process proceeds to step S640.

In step S640, the node can determine a next node to serve as the AP. The determination may be based on various factors, e.g., a power level, a duration of time serving as the AP, an order of MAC address. In another embodiment, a next node to serve as the AP may be predetermined and stored in a memory medium. The memory medium can be accessed to retrieve an identification of the next node. Then, the process proceeds to step S650.

In step S650, the node can transmit network information to the next node. The network information can include a notification to hand-off the AP, and any information gathered (e.g., a new node joined the network, power levels of nodes in the sub-network) while the node was serving as the AP. The next node can change its MAC address with the master-AP MAC address, and start to serve as the AP of the network. Then, the process proceeds to step S660.

In step S660, the node can be configured to go into a power save state, for example, when the node does not have other activities. Then, the process proceeds to step S670, and terminates.

It is noted that the process 600 may be repetitively executed by one or more nodes in the network.

Figure 7:
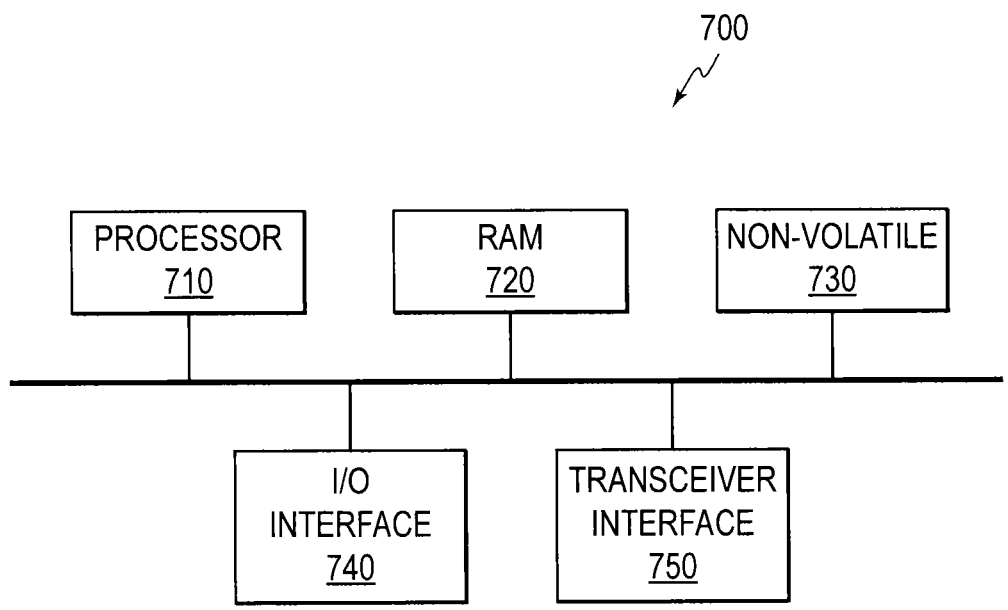
FIG. 7 shows a block diagram of an exemplary controller in a wireless device.

FIG. 7 shows a block diagram of an exemplary controller 700 in a wireless device which can support an AP rotation scheme. A controller 700 of the wireless device may include a processor unit 710, such as a general processor, a random access memory (RAM) unit 720, a non-volatile memory 730, an I/O interface unit 740, and a transceiver interface unit 750. These elements could be coupled together as shown in FIG. 7.

The processor unit 710 can execute system and application programs. The non-volatile memory 730 can hold information even when power is off. Therefore, the non-volatile memory 730 can be used to store system and application programs, such as firmware. The system and application programs may include an algorithm that may implement an AP rotation scheme.

The RAM unit 720 is readable and writable. Generally, the RAM unit 720 can have a fast access speed. It is preferred that data and codes of software programs are stored in the RAM unit 720 during operation, such that the processor unit 710 can access the RAM unit 720 for the codes and data instead of the non-volatile memory 730.

The I/O interface unit 740 is capable of taking input from the user and providing output to the user. For example, the I/O interface unit 740 can couple a keypad, a screen display, a touch screen, and the like. The user can input by pressing, for example, keys on the keypad or the touch screen, and monitor the status of the controller 700 displayed on the screen display, such as power level, signal strength, operation mode (e.g., AP or non-AP mode), and the like.

The transceiver interface unit 750 can be configured according to various standards and protocols. In an embodiment, the transceiver interface unit 750 can receive and transmit communication signals over a wireless local area network (WLAN) using protocols, such as Wi-Fi (IEEE 802.11 a/b/g), WiMax (IEEE 802.16), Bluetooth, and the like. In another embodiment, the transceiver interface unit 750 may also receive and transmit communication signals over a wireless wide area network (WWAN) using protocols, such as GSM, GPRS, UMTS, and the like.

During operation, the transceiver interface unit 750 may receive a signal conveying information of the network in which the wireless device is registered. The signal can be digitally sampled and transmitted to the processor unit 710. The digital samples of the signal can be stored in the RAM unit 720 and can be processed by the processor unit 710. The processor unit 710 may execute software programs, such as an algorithm implementing an AP rotation scheme, which may be stored in the non-volatile memory 730. For example, the processor unit 710 may identify an indication or a request from the digital samples of the signal that the wireless device is to serve as the AP of the network. The process unit 710 may execute the algorithm to start serving as the AP in a time interval.

More specifically, the processor unit 710 may change a MAC address of the wireless device to a master-AP MAC address associated with the network. The processor unit 710 may also generate beacons and transmit the beacons via the transceiver interface unit 750. A beacon may include the master-AP MAC address, for example, as Address-2 and Address-3 of 802.11 MAC header. In addition, the beacon may include power level information of devices. The wireless device, serving as the AP, can also receive messages over the transceiver interface unit 750 from other devices within the network as well as outside the network. For example, another device not registered with the network may send a registration request to the AP of the network. The registration request can be received and processed by the controller unit 700. Additionally, the controller unit 700 may send responses to the other devices via the transceiver interface unit 750. Further, the processor unit 710 may indicate the changed mode of operation for the user (e.g., from non-AP mode to an AP mode), for example, via screen display.

After a period of time serving as the AP, the processor unit 710 may acknowledge a next device to serve as the AP. In an embodiment, the processor unit 710 may determine the next device based on predetermined criteria (e.g., power level, duration of time, order of MAC address, signal strength, the user preference, and the like). In another embodiment, the processor unit 710 may retrieve an ID of the next node from a predetermined sequence stored in a memory. The processor unit 710 may also transmit network information (e.g., any new device joined the network, power levels of nodes) collected, while the wireless device serving as the AP, to the next device via the transceiver interface unit 750. Subsequently, the controller unit 700 may be configured to switch the wireless device into a power save mode.

The outlined flow chart in FIG. 6 can be implemented as a finite state machine (FSM) process including at least a power save state and a powered up state by each node of the network that can support an AP rotation scheme. One exemplary embodiment of a FSM process is illustrated in FIG. 8.

Figure 8:
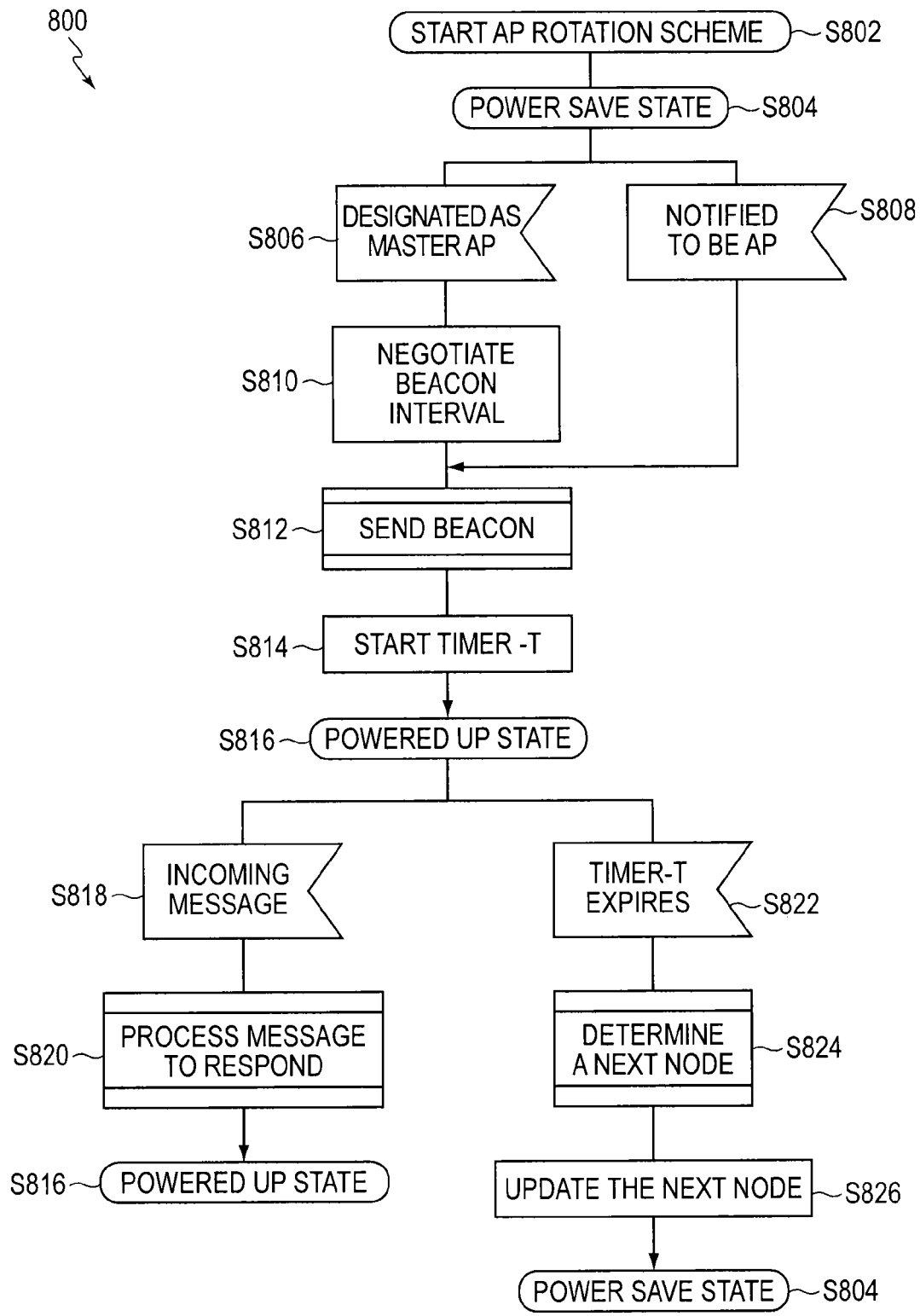
FIG. 8 is a specification and design language (SDL) diagram of an exemplary finite state machine (FSM) process executed by a network node capable of supporting an AP rotation scheme.

FIG. 8 is a specification and design language (SDL) diagram of an exemplary FSM process 800 executed by a node in a network. The node can be configured as either a master-AP or a pseudo-AP. The process starts at step S802, and proceeds to step S804.

In step S802, the node can consider various conditions to determine if the node can be configured to serve as an AP of the network. The various conditions may include, but not limited to: if the device is capable of supporting air interface protocols to access a wide area wireless network implementing GSM, GPRS, UMTS, and the like; if the device is capable of supporting a local area wireless network implementing Wi-Fi (IEEE 802.11 a/b/g), Wi-Max (IEEE 802.16), Bluetooth, and the like; if the device has sufficient power to serve as the AP; if the device implements a process to support an AP rotation scheme; and the like. If one or more of these conditions are met, then, the process proceeds to step S804.

In step S804, the node may be configured in a power save state, in which the node is operating in a non-AP mode, and thus saving its power. In the power save state, the node may be awakened and designated as a master-AP, for example, during an initialization of the network. If so, the process proceeds to step S806. The node can be also notified to be a next node to serve as the AP. Then, the process proceeds to step S808.

In step S806, the node may be designated to be the master-AP of the network. For example, a MAC address of the node can be associated with the network for network identification. In other words, messages directed to the AP of the network may use the MAC address of the node as the destination address. Then, the process proceeds to step S810.

In step S808, the node encounters an event that the node is being notified to be a next device to serve as the AP of the network. Then, the process proceeds to step S812.

In step S810, the node may negotiate a beacon interval (e.g., 10 ms) with other node(s). Then, the process proceeds to step S812.

In step S812, the node may send beacons. Each beacon may include the MAC address of the master-AP as previously explained in FIG. 5. Further, the MAC address of the node is replaced with the MAC address of the master-AP if the MAC address of the node is different from the MAC address of the master-AP. Additionally, the beacon may include power level of the node, conveyed in a 4 byte field of an energy information element (IE) included in the beacon as well as a probe response message. The energy IE can contain a 4 byte field that specifies in units of Watt-Hours the energy available. In case the device is power plugged, then this 4 byte field can have the value of all 0xFFFFFFFF. The node can power up and send out the beacon. Then, the process proceeds to step S814.

In step S814, the node can start a timer-T. The value of the timer-T can be the negotiated beacon interval. Then, the process proceeds to step S816.

In step S816, the node is in a powered up state, in which the node can operate as the AP. In the powered up state, the node may encounter an incoming message or expiration of the timer-T. In one case, the node encounters an incoming message, then the process proceeds to step S818. In another case, the node encounters expiration of the timer-T, then the process proceeds to step S822.

In step S818, the node encounters an incoming message from other node. Then, the process proceeds to step S820.

In step S820, the node can process the incoming message, and may send out corresponding response message. For example, the incoming message may be a probe request and corresponding response message is a probe response. In another example, the incoming message can also be an update information message coming from a predecessor node which previously served as the AP. The node presently serving as the AP can complete the processing of the incoming message. Then, the process returns to step S816, in which the node can continue to stay in the powered up state.

In step S822, the node encounters the timer-T expiration event. The node may invoke a child process to determine a next node to serve as the AP. It is also possible to implement the FSM 800 without the timer and the timer expiry event. The child process can be invoked by many criteria other than the timer expiry, either alone or in combination, for example: drop of the power level or signal strength of the node below threshold values, input triggered by the user of the node, a notification from another node to serve as the AP, a notification from another node being power plugged, and the like. Then, the process proceeds to step S824.

In step S824, the FSM process 800 invokes a child process 900 to determine a next node to serve as the AP. The child process 900 performs its tasks, as described in FIG. 9, and returns back to its parent process—the FSM process 800. Then, the process proceeds to step S826.

In step S826, the node can send an update message to update the newly selected node to serve as the AP. The update message may include any information gathered by the node during its powered up state. This is to enable the new node to behave coherently with any past transaction completed or in process of being completed with other nodes; thus, the AP being rotated by different nodes can be made seamless to the other nodes. Then, the process proceeds to step S804, and terminates.

In step S804, the node can be configured to go into the power save state, and operate as a non-AP. Then, the process terminates. It is noted that the FSM process 800 can be repetitively executed by a node, for example, nodes A, B, and C capable of serving as an AP.

Figure 9:
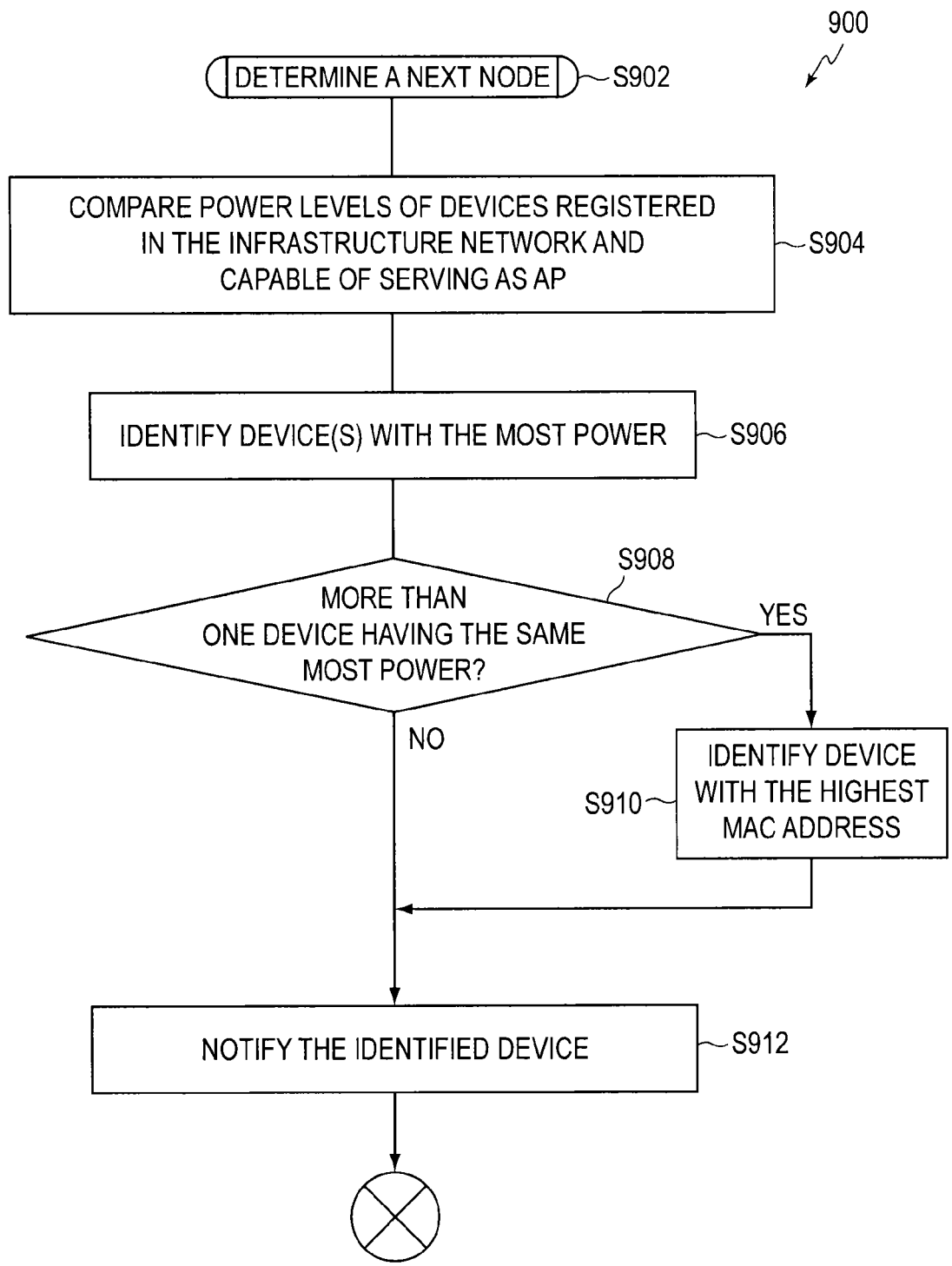
FIG. 9 is a specification and design language (SDL) diagram of an exemplary process for determining a next AP.

FIG. 9 is a specification and design language (SDL) diagram of an exemplary child process for determining a next AP. The process starts at step S902, and proceeds to step S904.

In step S902, the process is called by a parent process, for example, the FSM process 800 executed by the node currently serving as the AP to determine a next node to serve as the AP. The FSM process 800 can pass a number of input variables that the process S902 can use to determine a next node to serve as the AP. Then, the process proceeds to step S904.

In step S904, the node presently serving as the AP can compare power levels of nodes that are registered, for example, with the sub-network 210 and capable of serving as the AP (e.g., no legacy devices). Then, the process proceeds to step S906.

In step S906, the node may identify one or more nodes with the highest power level. It is possible that the node with the highest power level turns out to be the same node; the present node could potentially also be the next node to serve as the AP. Then, the process proceeds to step S908.

In step S908, if there are more than one node having the same highest power level, then the process proceeds to step S910. If there is only one device having the highest power level, then the process proceeds to step S912.

In step S910, the node may consider the MAC addresses of those nodes having the same highest power level in order to select one of those nodes by their order of MAC addresses, e.g., selecting a node with the highest or lowest MAC address as the next node to serve as the AP. After the one node with the highest power level and either the highest or lowest MAC address is selected, then the process proceeds to step S912.

In step S912, the node can notify the node being selected to serve as the AP, for example, node B. The notification can trigger the notified-to-be-AP event S808 of the FSM process 800 being executed by node B. Then, the process returns back to the parent process, for example, the FSM process 800 in step S824 being executed by node A currently serving as the AP. Then, the child process 900 terminates. It is noted that the child process 900 can be repetitively executed by a node, for example, the nodes A, B, and C capable of serving as the AP.

The exemplary FSM process 800 can be further improved to handle error and exception scenarios as well as race conditions; such details are not necessarily shown in FIG. 8 or FIG. 9. For example, in step S912 of FIG. 9, additional step can be added to handle incoming acknowledgment or error message after sending notification to a next node to serve as the AP; in case of an error message, it may go back to step S904 to find another node to be the AP. It could be that no other nodes capable of serving as the AP are left in the network other than the node presently serving as the AP. If so, the child process 900 may return to the FSM process 800 with a return code indicating that no node is available to serve as the AP of the sub-network 210. The node presently serving as the AP may then decide to skip step S826, proceeds to step S816, and continue to stay in the powered up state in order to serve as the AP.

Further, the node presently serving as the AP may even decide to temporarily disable AP rotation scheme until it detects newly joining nodes capable of serving as the AP; the FSM process 800 can implement AP-Rotation-Pending state in which the node presently serving as the AP continues to serve until it detects any new node capable of serving as the AP without proceeding to unnecessary steps, such as S814, S822, S824, and S826 while there is no other node to serve as the AP.

For another example, in step S820, the FSM process 800 could encounter the timer-T expiration event S822 while processing an incoming message; it may decide to stop processing and transfer the information necessary to a next node to serve as the AP for the next node to pick up where the node presently serving as the AP left off; or it may decide to complete the current processing of the incoming message but only stop processing any new incoming message. These enhancements can further insure that rotation of nodes to serve as the AP is done seamlessly, transparently, efficiently, and without any noticeable interruption.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for sharing power load in a network, comprising:
    identifying a first device to serve as a first point of the network in a next time interval based on one or more conditions, the first point enabling the network to communicate to other devices outside the network;
    providing network information from a second device that presently serves as the first point of the network to the first device, the network information including at least one of the other devices joining the network, wherein the first device starts to serve as the first point of the network in the next time interval; and
    configuring the second device to switch from a powered-up state to a power save state in order to reduce power consumption by the second device in the next time interval;
    wherein the first device changes an associated Media Access Control (MAC) address with a MAC address of a master-access point (AP), and starts to send messages that include the MAC address of the master-AP.

2. The method of claim 1, wherein the one or more conditions include at least a MAC address of the first device.

3. The method of claim 2, wherein the MAC address of the first device is the highest or lowest MAC address among MAC addresses of a plurality of devices.

4. The method of claim 1, wherein the one or more conditions include at least a power level of the first device.

5. The method of claim 4, wherein the power level of the first device is the highest power level among power levels of a plurality of devices.

6. The method of claim 1, wherein the one or more conditions include a pre-determined sequence.

7. The method of claim 6, further comprising:
    storing the pre-determined sequence in a memory.

8. The method of claim 1, wherein the identifying the first device to serve as the first point further comprising:
    selecting a node with the highest or lowest MAC address as the first device when a plurality of nodes has the same highest power level.

9. The method of claim 1, wherein the one or more conditions include at least a MAC address of the first device, a power level of the first device, a duration of time serving as the first point, and a user preference.

10. The method of claim 9, wherein the identifying the first device to serve as the first point further comprising:
    selecting the first device to serve as the first point based on combinations of two or more of the conditions.

11. A wireless device in a network, comprising:
    a wireless interface configured to transmit and receive wireless signals; and
    a controller configured to identify a next device to serve as a first point of the network in a next time interval based on one or more conditions, the first point enabling the network to communicate to other devices outside the network, inform the wireless interface to transmit network information to the next device when the wireless device presently serves as the first point of the network, the network information including at least one of the other devices joining the network, and switch the wireless device into a power save state from a powered-up state after the next device starts to serve as the first point of the network in the next time interval;
    wherein the controller is further configured to change an associated Media Access Control (MAC) address with a MAC address of a master-access point (AP), and inform the wireless interface to send messages that include the MAC address of the master-AP, when the wireless device presently serves as the first point of the network.

12. The wireless device of claim 11, wherein the one or more conditions include at least a MAC address of the next device.

13. The wireless device of claim 12, wherein the MAC address of the next device is the highest or lowest MAC address among MAC addresses of a plurality of devices.

14. The wireless device of claim 11, wherein the one or more conditions include at least a power level of the next device.

15. The wireless device of claim 14, wherein the power level of the next device is the highest power level among power levels of a plurality of devices.

16. The wireless device of claim 11, wherein the one or more conditions include a pre-determined sequence.

17. The wireless device of claim 16, further comprising:
    a memory configured to store the pre-determined sequence.

18. The wireless device of claim 11, wherein the controller is further configured to select a node with the highest or lowest MAC address as the next device when a plurality of nodes has the same highest power level.

19. The wireless device of claim 11, wherein the one or more conditions include at least a MAC address of the next device, a power level of the next device, a duration of time serving as the first point, and a user preference.

20. The wireless device of claim 19, wherein the controller is further configured to select the next device to serve as the first point based on combinations of two or more of the conditions.

* * * * *